United States Patent [19]

Suzuki et al.

[11] Patent Number: 4,503,722
[45] Date of Patent: Mar. 12, 1985

[54] ARM OPERATING DEVICE IN AUTOMATIC OPERATING MACHINE

[75] Inventors: Takeo Suzuki; Itsuro Matsumoto; Yoshihiro Yurita; Hideharu Zenpo, all of Kitakyushu, Japan

[73] Assignee: Kabushiki Kaisha Yaskawa Denki Seisakusho, Fukuoka, Japan

[21] Appl. No.: 362,810

[22] Filed: Mar. 29, 1982

Related U.S. Application Data

[63] Continuation-in-part of Ser. No. 122,348, Feb. 19, 1980, abandoned.

[51] Int. Cl.³ .............................................. F16H 21/44
[52] U.S. Cl. ..................................... 74/96; 74/89.21; 414/7; 901/21
[58] Field of Search ............... 74/89.2, 89.21, 89.22, 74/96, 470; 474/148–150; 414/1–8, 752, 753, 755; 901/21

[56] References Cited

U.S. PATENT DOCUMENTS

| | | | |
|---|---|---|---|
| 1,978,126 | 10/1934 | Blodgett | 74/89.21 |
| 2,660,894 | 12/1953 | McClelland | 74/89.22 |
| 3,020,778 | 2/1962 | Davidson | 74/470 |
| 3,294,256 | 12/1966 | Nazali et al. | 74/89.21 |
| 3,656,361 | 4/1972 | Honda | 474/150 |
| 3,707,092 | 12/1972 | Piech | 474/150 |

FOREIGN PATENT DOCUMENTS

| | | | |
|---|---|---|---|
| 2905927 | 8/1979 | Fed. Rep. of Germany | 414/4 |
| 1405253 | 5/1965 | France | 414/7 |
| 1173073 | 3/1973 | Japan . | |
| 7307363 | 1/1975 | Sweden . | |
| 530254 | 12/1940 | United Kingdom | 74/96 |

Primary Examiner—Lawrence J. Staab
Attorney, Agent, or Firm—Ladas & Parry

[57] ABSTRACT

In an arm operating device of an industrial robot, two chains are laid over the driving wheel provided in the supporting arm and the driven wheel provided in the bending arm, respectively, and are coupled through rigid transmission rods and a tension device to each other, and one of the transmission rods is rectangular in section, and is slightly pushed inwardly by a guide provided on the supporting arm, whereby the device operates positively and smoothly with being free from vibrations, and chain elongation and twist.

3 Claims, 5 Drawing Figures

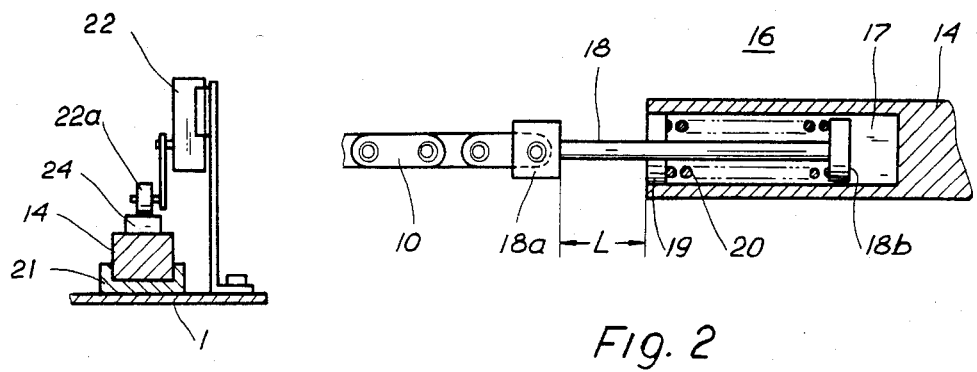
Fig. 1A
Fig. 2
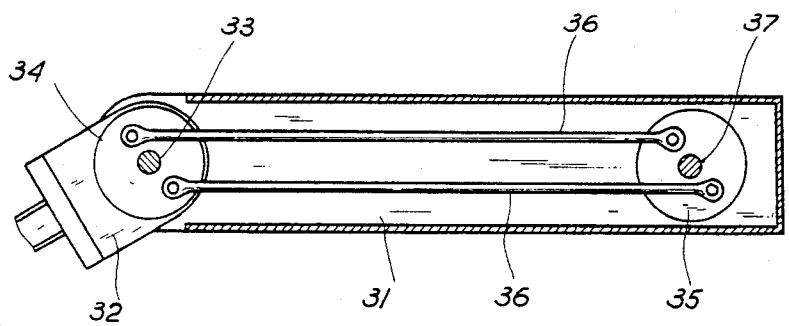
Fig. 3 PRIOR ART
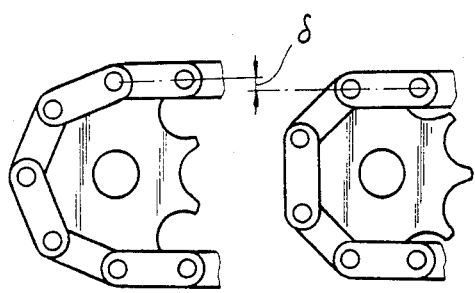
Fig. 4

ARM OPERATING DEVICE IN AUTOMATIC OPERATING MACHINE

The instant application is a continuation-in-part of the patent application Ser. No. 122,348, filed Feb. 19, 1980, now abandoned.

BACKGROUND OF THE INVENTION

This invention relates to a device for operating an arm of an automatic operating machine such as an industrial robot, and is intended to provide an arm operating device, in the arm of which tensioning means is provided to maintain the optimum tension is applied to the arm by means of wrapping power transmission belts and transmission rods to smoothly bend the arm.

In general, in an automatic operating machine, its arm is frequently bent or stretched to perform various operations. For intance, in bending or twisting the arm of a robot, it is necessary to turn a bending arm which is pivotally secured to its supporting arm through a predetermined angle. This will be described with reference to FIG. 3. A bending arm 32 which sometimes takes the form of a "wrist" is provided at one end portion of a supporting arm 31. The bending arm 32 has a rotating shaft 33 to which a link plate 34 is fixedly secured. Another link plate 35 is provided on the other end portion of the supporting arm 31. The link plate 35 is coupled to the link plate 34 by means of link rods 36, so that the link plate 34 turns as the link plate 35 is turned, thereby to move (turn) the bending arm 32. In FIG. 3, reference numeral 37 designates a driving shaft to which the link plate 35 is fixedly secured.

In another example of the conventional arm operating device, chain wheels are used instead of the link plates 34 and 35, and a chain, instead of the link rods 36, is laid over the chain wheels.

However, such a conventional device is disadvantageous in that the operation of the driven side is delayed because of the play of the link mechanism or the elongation of the chain, aas a result of which the amount of operation is varied. Especially in the device for transmitting driving power by the chain, the longer the length of the chain, the greater the effect of elongation of the chain. That is, as shown in FIG. 4, the chain is vertically vibrated with an amplitude δ depending on the position of the sprocket. This is especially undesirable in the case where the position of the wrist which is moved is detected by a dog secured to the chain, because the dog is vibrated with the chain, which vibration varies the operating position of the dog. Furthermore, if the chain is twisted by that vibration, then the operation thereof becomes unstable.

SUMMARY OF THE INVENTION

Accordingly, an object of this invention is to eliminate the above-described drawbacks accompanying a conventional arm operating device in an automatic operating machine.

More specifically, an object of the invention is to provide an arm operating device in an automatic operating machine, which arm operating device operates positively and smoothly, and is free from shocks, vibrations, chain elongation and twist, as well as any resulting delay in operation.

The novel features which are considered characteristic of this invention are set forth in the appended claims. The invention itself, however, as well as other objects and advantages thereof will be best understood by reference to the following detailed description and accompanying drawing.

BRIEF DESCRIPTION OF THE DRAWING

In the accompanying drawing:

FIG. 1A is a sectional view taken along line A—A in FIG. 1;

FIG. 2 is an enlarged sectional view showing a tension device in FIG. 1;

FIG. 3 is a sectional view showing one example of a conventional prior art arm operating device; and FIG. 4 is an explanatory diagram for a description of the variation of the pitch circle of a chain.

DETAILED DESCRIPTION OF THE INVENTION

Figure 1:
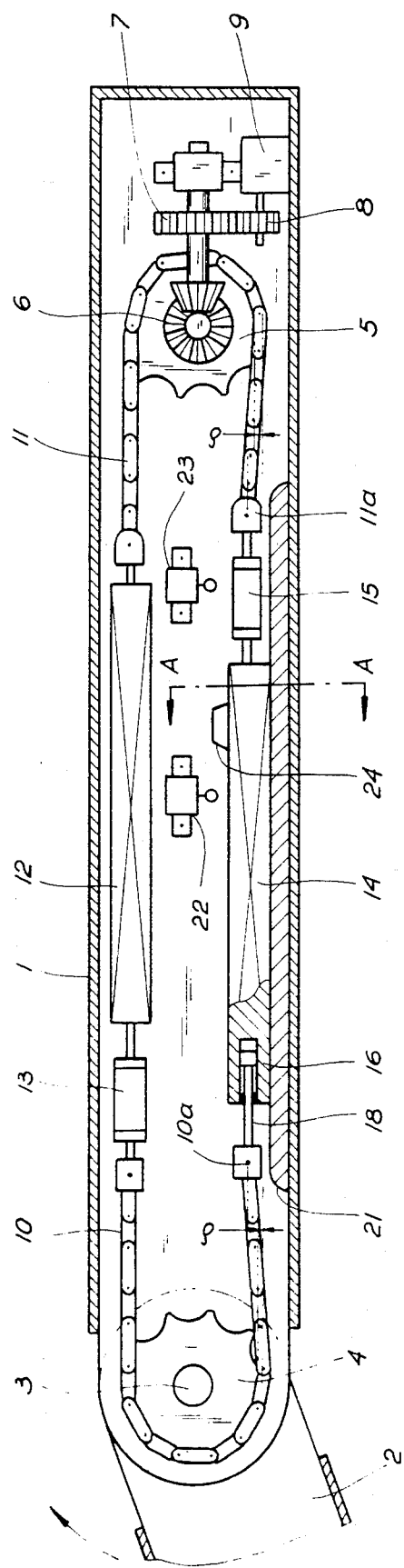
FIG. 1 is a sectional view showing one example of an arm operating device according to this invention.

One example of an arm operating device in an automatic operating machine according to this invention, as shown in FIGS. 1 and 2, comprises: a supporting arm 1; and a bending arm 2 to which a gripping device or the like is connected. The bending arm 2 has a supporting shaft 3 which is rotatably coupled to one end portion of the supporting arm 1, so that the bending arm 2 can turn through a predetermined angle. A driven wheel 4 is fixedly mounted on the supporting shaft 3 so as to turn the bending arm 2. A driving wheel 5 is mounted on a shaft 6 at the other end portion of the supporting arm 1, and the driving wheel 5 is driven through gears 7 and 8 by an operating electric motor 9. Power transmitting belts 10 and 11, e.g. chains, are laid over the driven wheel 4 and the driving wheel 5, respectively. The length of each chain is long enough to turn the bending arm 2 through a predetermined angle; however, it is made as short as possible.

In FIG. 1, reference characters 10a and 11a designate coupling pins; and the one-dot chain line is the tangential line of wrapping circles of the two wheels; the two-dot chain line indicates the position of the chain which is displaced as much as an amplitude δ inwardly of the tangential line because of the positional variation of the sprockets; and the three-dot chain lines indicate the positions of the center of the coupling pins 10a and 11a. One end of the chain 11 is coupled through a rigid transmission rod 12 and a turn-buckle 13 to one end of the chain 10. Another rigid transmission rod 14 is provided between the other ends of the chains 10 and 11. More specifically, one end of the transmission rod 14 is coupled through a turnbuckle 15 to the other end of the chain 11, and the other end of the rod 14 is coupled through a tension device 16 to the other end of the chain 10.

The tension device 16, as shown in FIG. 2, has a hollow 17 formed in one end portion of the transmission rod 14, and a connecting rod 18 inserted into the hollow 17. The outer end portion 18a of the connecting rod 18 is coupled to the chain 10. A spring 20 is interposed between the inner end portion, or a flange 18b, of the rod 18 and the cover 19 of the hollow 17. A guide 21 is provided on the inner wall of the supporting arm 1, and at least the surface of the guide 21 is covered with a synthetic resin lining, having a low frictional coefficient so that the side of the transmission rod 14 can smoothly slide thereon. The guide sliding surface is shifted towards the center of the wheels 4 and 5 from the tangential line of the chain pitch circles of the wheels 4 and 5. An additional guide may be provided for the other transmission rod 12 in the same manner, if necessary. Reference numerals 22 and 23 designate limit switches mounted on the supporting arm 1, and reference numeral 24 designates a dog secured to the transmission rod 14.

In operation, if the driving wheel 5 is turned clockwise by operating the motor 9, then the driving power is transmitted through the chain 11, the transmission rod 12 and the turnbuckle 13 to the chain 10, to pull the latter 10. As a result, the driven wheel 4 is turned clockwise, and accordingly the bending arm 2 is turned in the direction of the arrow. In this operation, the transmission rod 14 is slid on the guide 21 through the tension device 16. Accordingly, when the bending arm has been turned through a predetermined angle, the dog 24 of the transmission rod 14 abuts against (or operates) the limit switch 22 to cause the switch 22 to provide a signal to stop the motor 9.

The tension of the chains 10 and 11 can be adjusted by using the turnbuckles 13 and 15 and the tension device. If the turnbuckle is turned to pull the transmission rod 14 towards the chain, the length L of the exposed portion of the connecting rod 18 is increased (FIG. 2), and the spring 20 is compressed to increase the tension. Therefore, if the connecting rod is graduated with marks for indication of variations of the length L of the exposed portion, then the tension of the chain can be adjusted by visually detecting the variation.

In the above-described example, the transmission rods 12 and 14 are coupled to the turnbuckles 13 and 15, respectively, and the transmission rod 14 is further coupled to the tension device 16; however, it should be noted that the invention is not limited thereto or thereby. That is, any rigid members can be employed as the transmission rods 12 and 14, so long as they are coupled to the chains in such a manner that the tension of the chains can be adjusted as desired. The transmission rod is rectangular in section and has a flat sliding surface which is in contact with the surface of the guide 21, so that the transmission rod is not turned or twisted around its axis. As the flat sliding surface of the transmission rod is shifted by δ towards the wheels from the tangential line of the minimum pitch circles of the wheels 4 and 5 to push the chain inwardly, the transmission rod is satisfactorily in contact with the guide and accordingly the vertical vibration of the dog 24 is positively prevented, whereby the limit switch is stably operated.

In the above-described example, the chains are laid over the wheels for power transmission; however, timing belts and pulleys may be used in combination for power transmission, and alternatively wrapping transmission belt means may be employed with which, when tension is applied tangentially of the wrapping circles of the two wheels, the pitch circle diameter in a direction perpendicular to the tangential line is varied. Furthermore, the tension device may be replaced by a cylinder utilizing pneumatic pressure or hydraulic pressure.

As is apparent from the above description, the subject arm operating device turns the bending arm coupled to the supporting arm. The driving wheel and the driven wheel thereof are provided in the supporting arm, and the wrapping power transmission belts, which are made as short as possible according to the range of rotational operation, are laid over the wheels, respectively. The transmission belts are coupled through the tension device and the rigid transmission rods. As a result of this arrangement, the wrapping power transmission belts (such as chains) are relatively short and the transmission belts are therefore scarcely elongated. Accordingly, the arm operating device of the invention is free from the shock which otherwise may be caused by the play of the chains, the delay in response of the driven side, and the variations in motion. With the natural frequency of the entire power transmission device being increased as the result of shortening chains by inserting rigid rods thereinto, the operation of the device is smooth at all times. Furthermore, the flat contact surface prevents the transmission rod from turning around its axis, and the wrapping power transmission belts from twisting themselves, which serves to increase the service lives of the wrapping power transmission belts. Thus, the arm operating device of the invention is positively operated without noises.

This will be herein supplementarily explained with respect to the arm of the device. Although, in FIG. 1, both members 1 and 2 appear to be arms, the member 1 can be replaced for the body of a robot. In the case where the driven member designated by 2 is, as is shown in FIG. 3, a wrist, the device of the present invention can be used as it is to bend the wrist. On the other hand, in order to twist the wrist, the chain system can be smoothly operated by the device of the present invention, provided that bevel gears are used to change direction in the same way as shown in the driving source in the right side of FIG. 1. Accordingly, it is noted that a driven member 2 may be an arm or a wrist.

Furthermore, according to the invention, the plane where the transmission rod is in contact with the guide is shifted inwardly of the tangential line of the wrapping circles of the wheels, and is maintained held in the direction of extension of the wrapping power transmission belt, whereby the operation is stable, and the limit switches are positively operated by the dog secured to the transmission rod. In addition, the tension of the chains can be visually detected by means of the tension device. Even when an impact is abruptly imparted to the automatic operating machine, the arm operating device of the invention can absorb the impact.

We claim:

1. An arm or wrist operating device for an automatic operating machine, said operating device including a supporting arm, a bending arm which is rotatably supported on said supporting arm, and drive means for turning said bending arm, wherein the drive means incorporates a driving wheel, a driven wheel, first and second wrapping power transmission belts laid over said driving wheel and said driven wheel respectively, first and second transmission rods, one end of said first wrapping power transmission belt being coupled through said first transmission rod to one end of said second wrapping power transmission belt, and the other end of said first wrapping power transmission belt being coupled through said second transmission rod and a tension device to the other end of said second wrapping power transmission belt, said tension device incorporating a connecting rod, one end of which is connected to the second transmission belt and the other end of which is accommodated in a hollow end of the second transmission rod and is coupled thereto by a spring dashpot assembly, and a guide supporting said second transmission rod for sliding movement, said guide being located on the inner wall of said supporting arm in such a manner that the centers of coupling pins adapted to couple the wrapping connector power transmission belts to said second transmission rod are positioned inwardly of a line tangent to the minimum pitch circles of said wheel, each said wrapping power transmission belt having slack adjusting means and being made as short as possible according to a predetermined rotational operation range.

2. An operating device as claimed in claim 1, wherein said slack adjusting means are turnbuckles.

3. A device as claimed in claim 1 or 2, wherein the sliding surface of said guide on which said second transmission rod slides is flat.

* * * * *